(12) United States Patent
Macduff et al.

(10) Patent No.: US 10,845,063 B2
(45) Date of Patent: *Nov. 24, 2020

(54) HYDRONIC SUPPLY MANIFOLD

(71) Applicants: Malcolm Macduff, Victoria (CA);
James Macduff, Victoria (CA)

(72) Inventors: Malcolm Macduff, Victoria (CA);
James Macduff, Victoria (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/554,689

(22) PCT Filed: Feb. 6, 2017

(86) PCT No.: PCT/CA2017/050131
§ 371 (c)(1),
(2) Date: Aug. 30, 2017

(87) PCT Pub. No.: WO2018/141042
PCT Pub. Date: Aug. 9, 2018

(65) Prior Publication Data
US 2019/0285286 A1 Sep. 19, 2019

(51) Int. Cl.
*F24D 3/10* (2006.01)
*F16L 41/03* (2006.01)
(Continued)

(52) U.S. Cl.
CPC .......... *F24D 3/1075* (2013.01); *F16H 27/06* (2013.01); *F16K 11/10* (2013.01); *F16K 11/14* (2013.01);
(Continued)

(58) Field of Classification Search
CPC ..... Y10T 137/87096; Y10T 137/87129; Y10T 137/877; Y10T 137/87708;
(Continued)

(56) References Cited

U.S. PATENT DOCUMENTS 441,460 A * 11/1890 Atwood .................. F16H 55/06
74/460
1,081,996 A * 12/1913 Weist ...................... F16H 55/06
74/460
(Continued)

FOREIGN PATENT DOCUMENTS

| CN | 2837652 Y | 11/2006 |
|---|---|---|
| FR | 451039 A | 4/1913 |
| JP | 2008291772 A | 12/2008 |

OTHER PUBLICATIONS

International Search Report and Written Opinion for PCT Application PCT/CA2015/051219.
(Continued)

*Primary Examiner* — Seth W. Mackay-Smith
(74) *Attorney, Agent, or Firm* — James P. Muraff; McDonald Hopkins LLC

(57) ABSTRACT

A manifold has a frame and a plurality of valves supported by the frame, each valve having a cross gear that includes four semicircular recesses and four arms that terminate in pointed tips, and wherein the tips are non-jamming rubber tips. The manifold also has a screw drive and a splined rotatable shaft parallel to the screw drive. The manifold further includes a slider driven by the screw drive over the splined rotatable shaft. The slider includes an actuator that protrudes from the slider to engage one of the cross gears to actuate a respective one of the plurality of valves.

15 Claims, 20 Drawing Sheets

(51) Int. Cl.
*F16K 31/04* (2006.01)
*F16K 11/10* (2006.01)
*F16K 11/14* (2006.01)
*F16H 27/06* (2006.01)
*F16K 11/16* (2006.01)
*H01H 3/44* (2006.01)

(52) U.S. Cl.
CPC ............ *F16K 31/04* (2013.01); *F24D 3/1066* (2013.01); *F16K 11/163* (2013.01); *F16K 31/043* (2013.01); *H01H 3/44* (2013.01); *Y10T 74/1441* (2015.01); *Y10T 74/19879* (2015.01); *Y10T 137/87096* (2015.04); *Y10T 403/593* (2015.01)

(58) Field of Classification Search
CPC ..... Y10T 137/87732; Y10T 137/87877; Y10T 403/593; Y10T 403/7026; Y10T 74/1441; Y10T 74/19879; F16K 5/02; F16K 5/0285; F24D 19/1024; F24D 3/1066; H01H 3/44; F16H 27/06
USPC ................ 74/25, 27, 55, 74, 411, 461, 820; 251/248
See application file for complete search history.

(56) References Cited

U.S. PATENT DOCUMENTS

| | | | |
|---|---|---|---|
| 1,147,805 A * | 7/1915 | Kunz et al. | F16H 55/06 74/460 |
| 1,990,990 A | 2/1935 | Hathorn et al. | |
| 2,285,221 A * | 6/1942 | Mueller | F16K 5/0207 251/286 |
| 2,530,581 A * | 11/1950 | Markis | F24D 19/1033 237/8 R |
| 3,496,802 A * | 2/1970 | Arnold | F16H 55/18 475/180 |
| 4,034,613 A | 7/1977 | Halfhill et al. | |
| 4,073,468 A * | 2/1978 | Erwin | F16K 5/02 251/163 |
| 4,159,651 A | 7/1979 | MacPhee | |
| 4,274,802 A | 6/1981 | Inaba et al. | |
| 4,281,240 A * | 7/1981 | Smilgys | G06M 1/163 235/139 R |
| 4,617,957 A | 10/1986 | Sandling et al. | |
| 4,687,941 A | 8/1987 | Lasberg et al. | |
| 4,878,652 A * | 11/1989 | Wordin | F16K 5/0207 251/181 |
| 4,905,913 A | 3/1990 | Frikker | |
| 5,026,329 A * | 6/1991 | Diekevers | B62D 55/0963 474/162 |
| 5,044,606 A | 9/1991 | Wordin | |
| 5,111,997 A * | 5/1992 | Ikuta | B05B 13/0452 239/227 |
| 5,203,861 A * | 4/1993 | Irwin | B65G 23/06 474/161 |
| 5,337,780 A * | 8/1994 | Kee | A61M 1/0064 137/381 |
| 5,445,674 A | 8/1995 | Demars et al. | |
| 5,482,212 A | 1/1996 | Kobryn et al. | |
| 5,704,248 A * | 1/1998 | Knotts | F16H 1/12 248/562 |
| 5,735,307 A | 4/1998 | Charron et al. | |
| 7,032,983 B2 * | 4/2006 | Wu | F16H 55/14 305/195 |
| 7,052,424 B2 * | 5/2006 | Kabrich | B62D 55/12 474/162 |
| 7,162,884 B2 | 1/2007 | Alles | |
| 7,633,837 B2 * | 12/2009 | Daout | G04B 35/00 368/220 |
| 8,201,471 B2 * | 6/2012 | Ohmi | F16H 55/0886 74/462 |
| 8,468,904 B2 * | 6/2013 | Nowicki | F16H 55/16 74/411 |
| 8,555,926 B2 * | 10/2013 | MacDuff | F24D 3/1066 137/883 |
| 8,621,952 B2 * | 1/2014 | Sokolofsky | F16H 55/18 74/439 |
| 8,726,753 B2 * | 5/2014 | Yang | F16H 55/16 74/409 |
| 8,904,894 B2 * | 12/2014 | Geiser | F16H 55/16 368/38 |
| 9,803,876 B2 * | 10/2017 | MacDuff | F24D 3/1066 |
| 10,260,641 B2 * | 4/2019 | Ke | F16K 5/02 |
| 2007/0012134 A1 * | 1/2007 | Daout | F16H 55/16 74/440 |
| 2008/0073287 A1 * | 3/2008 | Kolber | A61L 2/10 222/1 |
| 2008/0141802 A1 | 6/2008 | Smick et al. | |
| 2011/0120241 A1 * | 5/2011 | Caliari | F16H 19/025 74/25 |
| 2012/0048381 A1 * | 3/2012 | MacDuff | F24D 3/1066 137/1 |
| 2014/0144259 A1 * | 5/2014 | Downs | B60K 23/08 74/55 |
| 2017/0102152 A1 * | 4/2017 | MacDuff | F24D 3/1066 |
| 2017/0321906 A1 * | 11/2017 | MacDuff | F24D 3/1066 |

OTHER PUBLICATIONS

International Search Report and Written Opinion of the International Searching Authority in related application PCT/CA2017/050131 dated Oct. 24, 2017.
Extended Search Report for European Patent Application No. EP 17732281.5", dated Jan. 31, 2019, 9 pages.

* cited by examiner

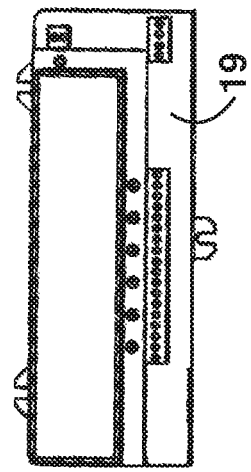
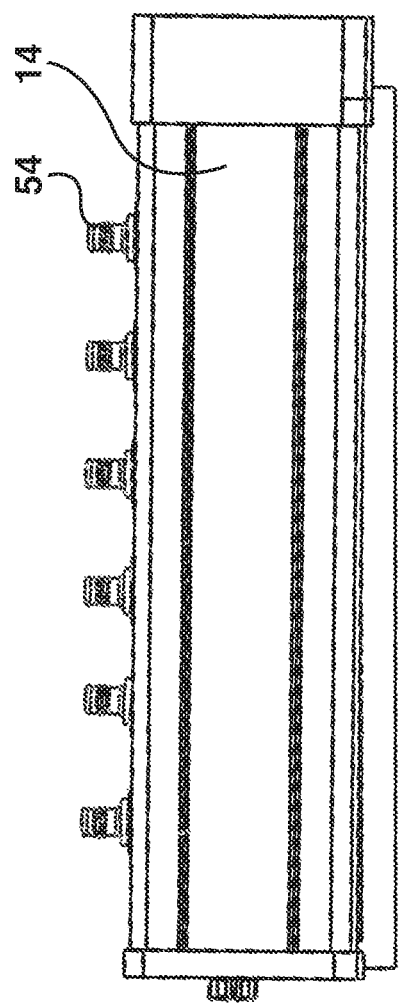
FIG. 4

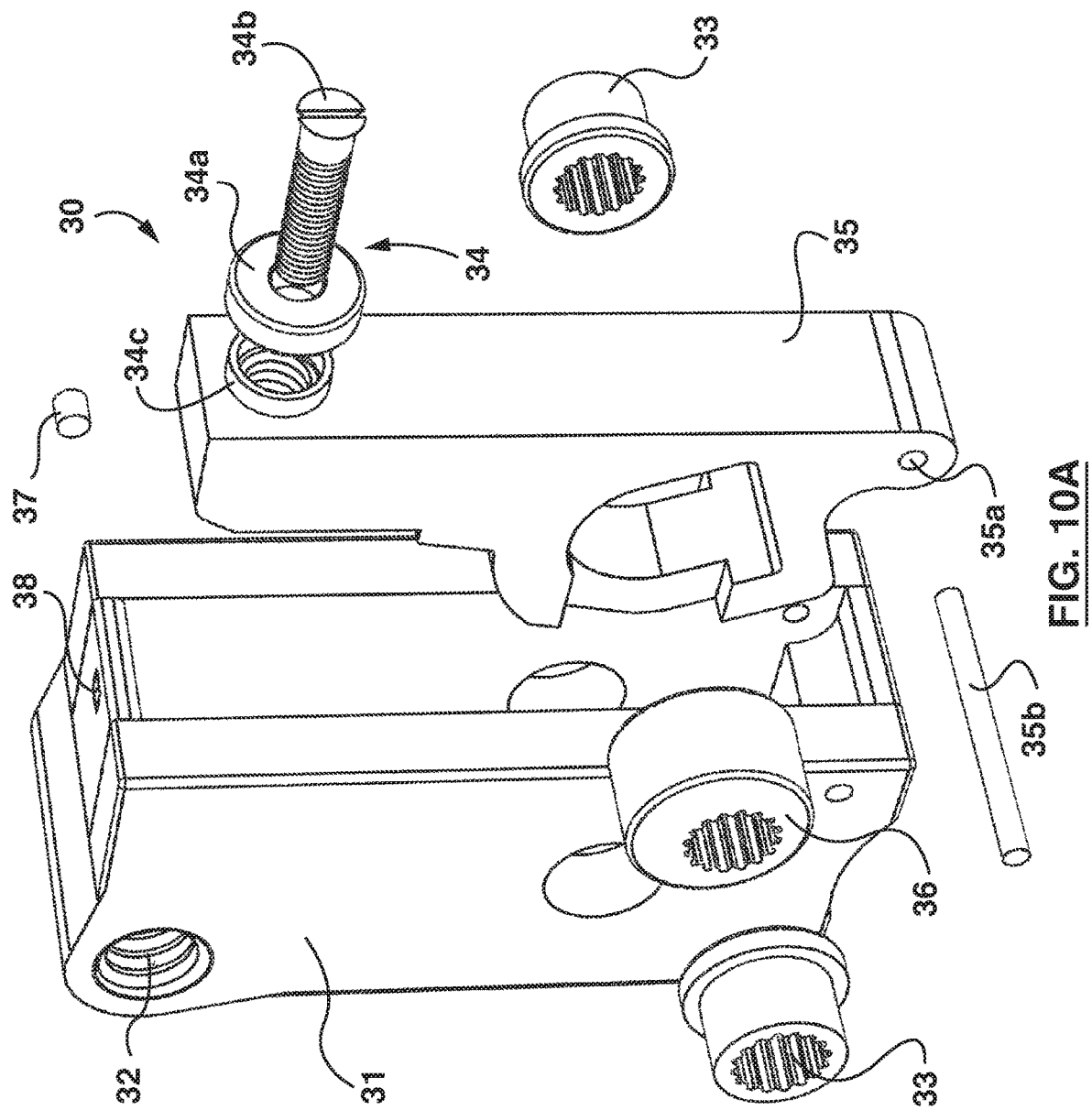

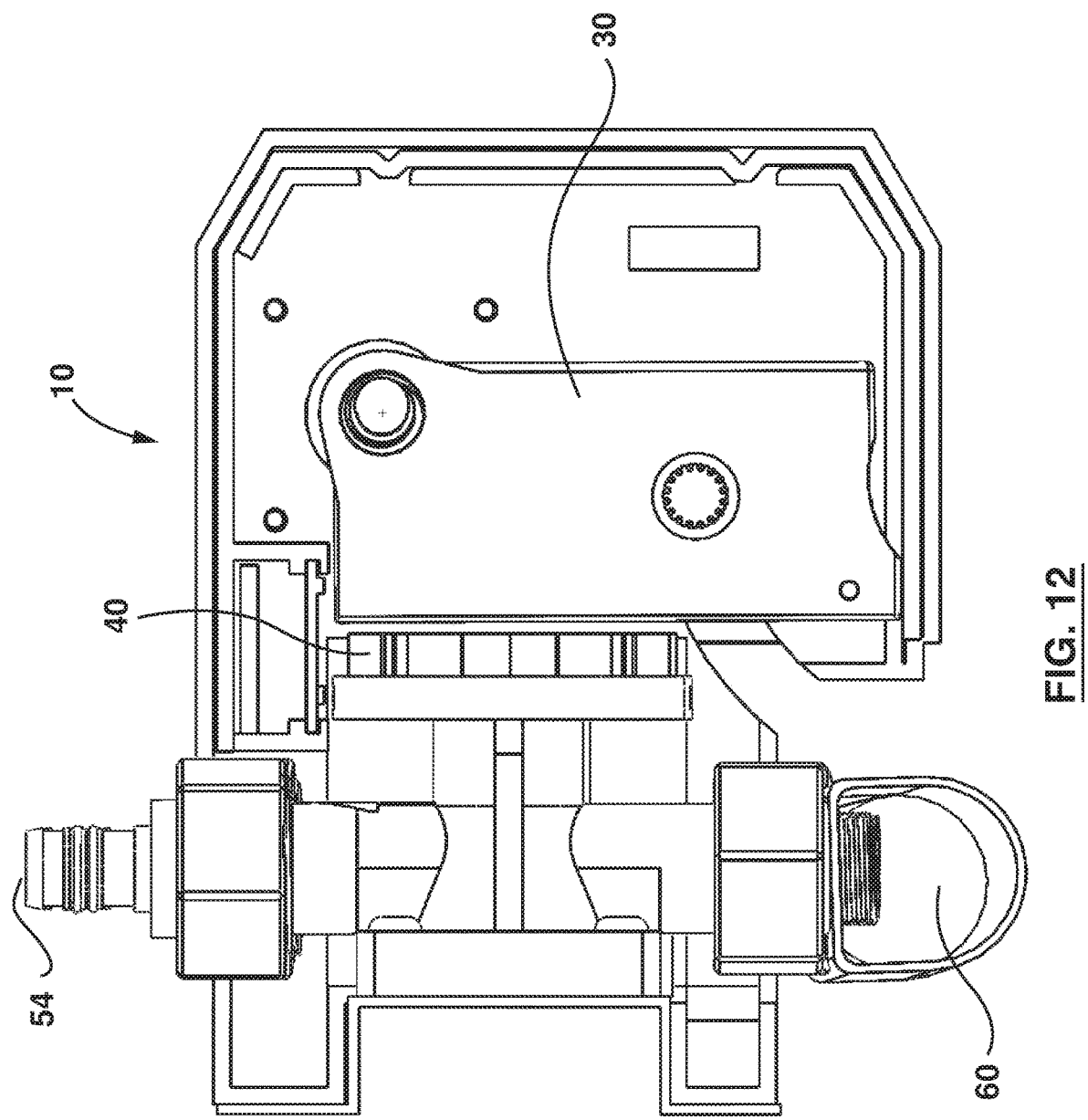

US 10,845,063 B2

HYDRONIC SUPPLY MANIFOLD

CROSS-REFERENCE TO RELATED APPLICATION

This application is a national stage patent application of PCT/CA2017/050131, filed on Feb. 6, 2017 entitled "HYDRONIC SUPPLY MANIFOLD" which is incorporated by reference in its entirety.

TECHNICAL FIELD

The present invention relates generally to hydronic heating or cooling systems and, more particularly, to supply manifolds for hydronic heating or cooling systems.

BACKGROUND

Hydronic heating or cooling systems deliver warm or cool liquid, e.g. water, through conduits to heat or cool surfaces such as floors (radiant floor heating/cooling) or walls (radiant wall heating/cooling). Some such systems deliver liquid through conduits to multiple zones. In conventional systems, multiple zone valves are used to regulate the flow of liquid to each of the conduits. In other words, there is one zone valve for every zone in the dwelling. A problem with these multi-zone hydronic systems is that the supply manifold is complex and expensive, requiring individual actuators to actuate each of the zone valves. U.S. Pat. No. 8,555,926 (MacDuff) entitled Supply Manifold For Hydronic System discloses a manifold with an actuator that translates along an array of valves to selectively actuate a desired valve by engaging cross gears attached to the valve. The manifold however employed an solenoid as its actuator, thereby requiring electric wires to travel back and forth with the carriage. An improved actuation mechanism for the manifold is therefore desirable. Improvements to the valve design are also desirable to provide precise and leak-proof opening and closing.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a supply manifold for a hydronic heating or cooling system. The manifold has a slider that is moved by a screw drive and rides over a splined rotatable shaft whose rotation causes the slider to actuate a valve of the manifold. The valves of the manifold have cross gears attached to them. The valves have cone-shaped plugs that diverge in a direction away from the cross gears and which are secured in place by water diverted from the central water passage through the valve.

One inventive aspect of the disclosure is a manifold comprising a frame, a plurality of valves supported by the frame, each valve having a cross gear, a screw drive, a splined rotatable shaft parallel to the screw drive, and a slider driven by the screw drive over the splined rotatable shaft, the slider comprising an actuator that protrudes from the slider in response to rotation of the splined rotatable shaft to thereby engage one of the cross gears to actuate a respective one of the plurality of valves.

Another inventive aspect of the disclosure is a slider for a manifold, the slider comprising a slider housing, a receptacle in the slider housing for receiving a screw drive, a splined hole in the slider for receiving a splined rotatable shaft and an actuator that protrudes from the slider in response to rotation of the splined rotatable shaft.

Yet another inventive aspect of the disclosure is a valve for a manifold, the valve comprising an inlet, an outlet, a cross gear mounted to the valve and a cone-shaped plug that tapers outwardly in a direction away from the cross gear.

BRIEF DESCRIPTION OF THE DRAWINGS

These and other features of the disclosure will become more apparent from the description in which reference is made to the following appended drawings.

FIG. 4 is a side view of the assembled manifold.

FIG. 10A is an exploded view of a first embodiment of the slider.

FIG. 12 is a side cutaway view of the slider and valve assembly with the actuator retracted.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

One exemplary embodiment of the novel supply manifold is depicted in FIGS. 1-13. It should be understood that this exemplary embodiment represents only one way of implementing this technology. In other words, many variations, modifications and refinements may be made to the mechanisms presented herein without departing from the fundamental inventive concept(s).

Figure 1:
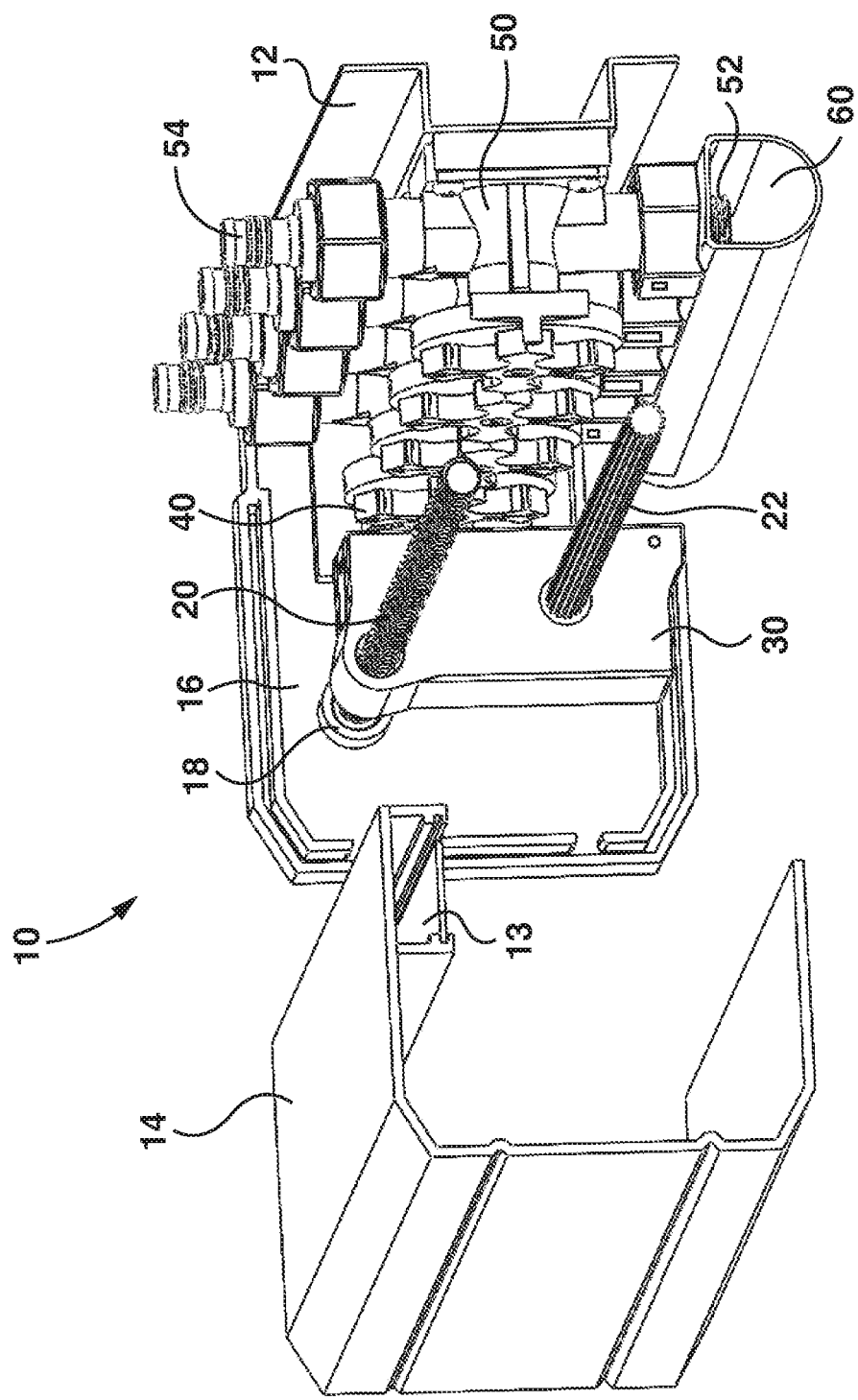
FIG. 1 is an isometric exploded view of a manifold in accordance with an embodiment of the present invention.

In the embodiment shown by way of example in FIG. 1, a supply manifold generally designated by reference numeral 10 has a frame 12 (e.g. a channel-shaped member as shown by way of example in FIG. 1 or any equivalent bracket, base or support) and a generally U-shaped manifold housing 14 (or cover or case). A pair of side panels 16 enclose the manifold on each side (although only one such panel 16 is shown in FIG. 1). The side panel 16 has a mount 18 for supporting a drive screw 20 and a splined rotatable shaft 22. The drive screw and splined rotatable shaft are parallel to each other. The drive screw displaces a slider 30 whereas the splined rotatable shaft acts as a linear guide for the slider. As will be described below in greater detail, the splined rotatable shaft 22 also functions to rotate an actuator within the slider to actuate a desired valve, i.e. to open or close a desired valve.

As shown in FIG. 1, the slider 30 (which carries the actuator) is displaced along the screw drive 20. The screw drive 20 comprises an elongated screw-type drive shaft in the form of a threaded rod or threaded shaft. The actuator, which is carried by the slider 30, is shaped to engage a cross gear 40 connected to a respective valve 50. Rotation of the cross gear causes rotation of the valve to which it is connected. As the slider 30 is advanced by the screw drive 20, the actuator selectively protrudes to engage and rotate the cross gear by an angle of ninety degrees (i.e. one quarter turn). This quarter-turn rotation causes the quarter-turn valve 50 to open (if it was closed) or to close (if it was open). Once the cross gear has been rotated one quarter turn the actuator is disengaged from the cross gear. The screw drive 20 can be then actuated to move the slider (and its actuator) to another valve for opening or closing as desired. The slider 30 can thus be displaced to any desired one of the inline valves 50 by the screw drive 20. Once the screw drive 20 has positioned the slider 30 in the desired position, the actuator in the slider 30 actuates/engages the gear cross connected to the valve to open or close the valve.

In the embodiment shown in FIG. 1, the manifold 10 includes a plurality of valves 50 and a plurality of respective cross gears 40. The valves 50 are quarter-turn plug valves or alternatively quarter-turn ball valves. These valves can be opened or closed by a ninety-degree rotation of the plug or ball inside the valve. In the illustrated embodiment, the valves 50 are arranged in an inline arrangement, i.e. side by side and equally spaced apart. Although there are four outlets (and four valves) in the manifold depicted by way of example in FIG. 1, the number of valves 50 in the manifold 10 and/or their relative spacing may be varied in other embodiments.

As shown in FIG. 1, a water supply tube 60 is in orthogonal fluid communication with the valves 50. Water from the water supply tube 60 enters an inlet 52 of the valve 50 and, if the valve is open, flows out of the valve through an outlet 54. Each of the valves 50 can be opened or closed independently. The manifold 10, when used in a hydronic heating or cooling system, can thus control the flow of water to any one or more of the zones of the dwelling or building in which the hydronic system is installed. In other words, the water supply tube 60 receives a heating liquid for a hydronic heating system (or a cooling liquid for a hydronic cooling system) from a upstream source that is not shown in the figures. The tube 60 may be copper tubing with a flat upper surface or any equivalent tube, pipe or conduit.

In the embodiment depicted in FIG. 1, the manifold housing 14 has a channel-like portion adapted to receive and retain a circuit board, e.g. a printed circuit board (PCB) on which various electronic sensors may be disposed. The PCB may include slider positioning sensors to sense a position of the slider. The PCB may include cross gear positioning sensors that sense the position (or angular orientation) of the cross gears (indicative of whether the valves are open or closed).

Figure 2:
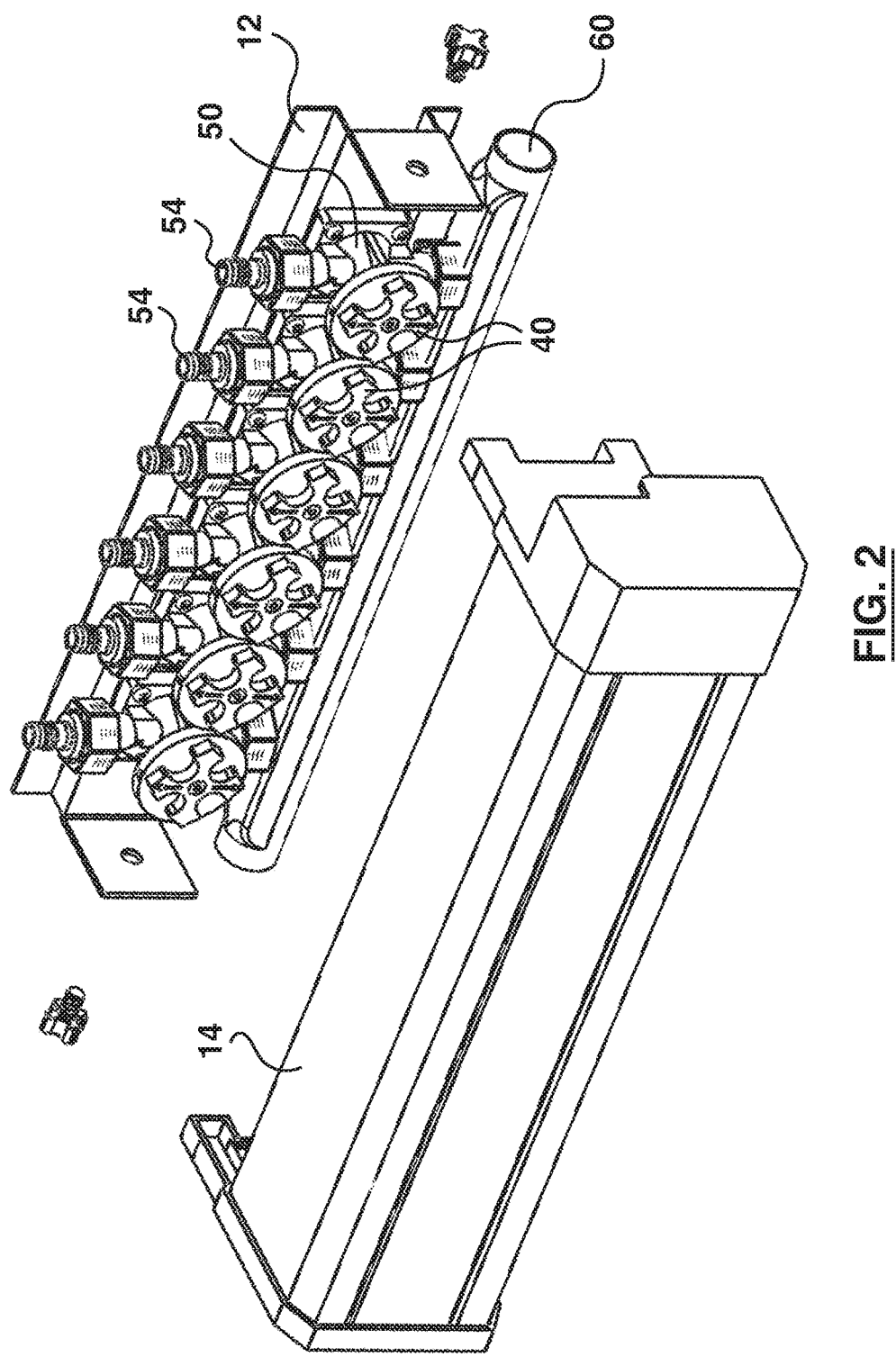
FIG. 2 is another isometric exploded view of a housing and valve assembly with the valve outlets facing upwardly.
Figure 3:
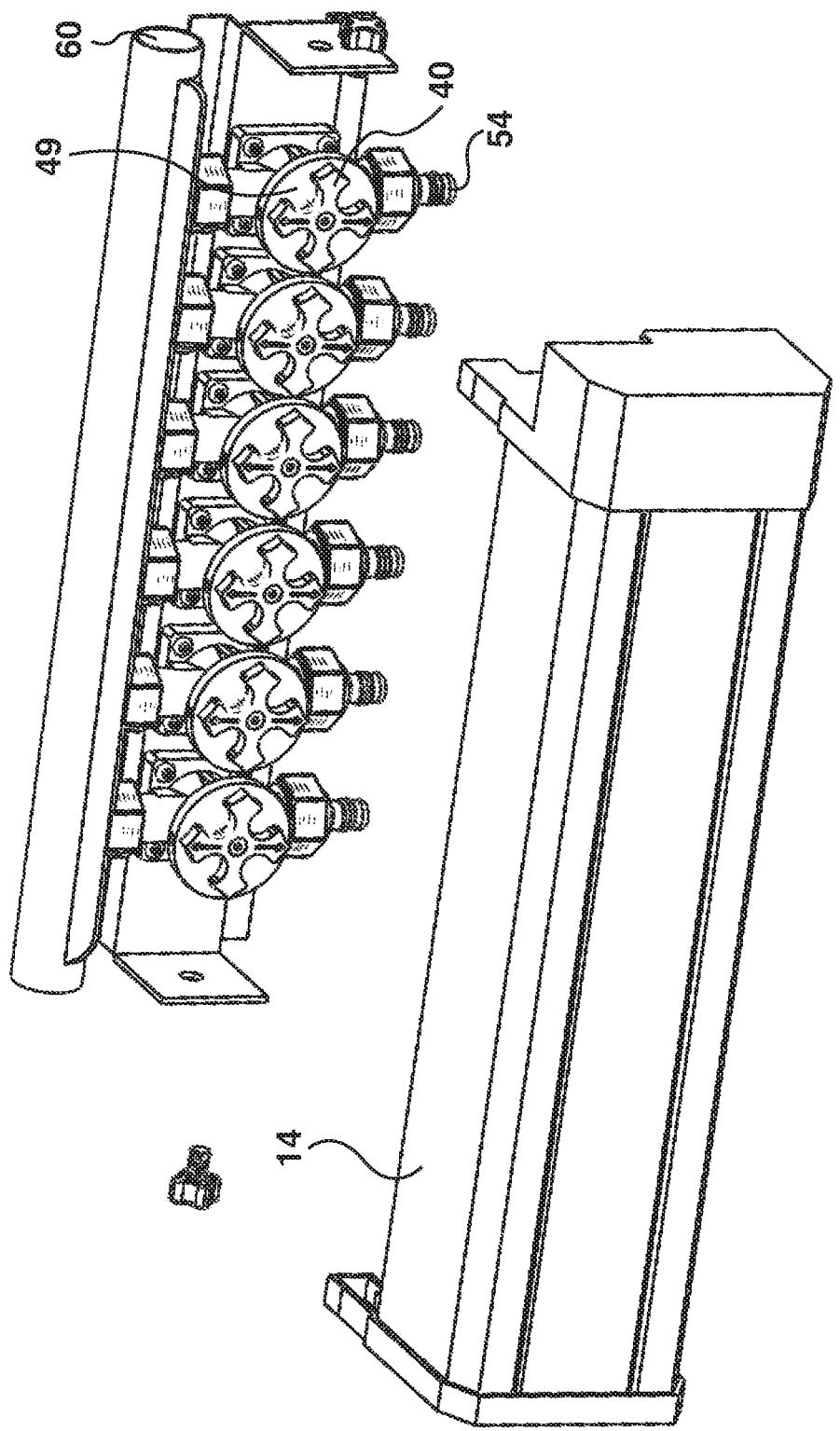
FIG. 3 is another isometric exploded view of a housing and valve assembly with the valve outlets facing downwardly.

The manifold may be assembled with the outlets 54 facing upwardly, as depicted in FIG. 2, or with the outlets 54 facing downwardly, as depicted in FIG. 3. When assembled, the outlets 54 protrude beyond the manifold housing 14 as shown by way of example in FIG. 4. FIG. 4 also depicts an example of an external controller 19 (which may be a microcontroller, microprocessor, printed circuit board, etc). The controller 19 can interact wirelessly or via wires with the manifold to open and close the valves.

Figure 5:
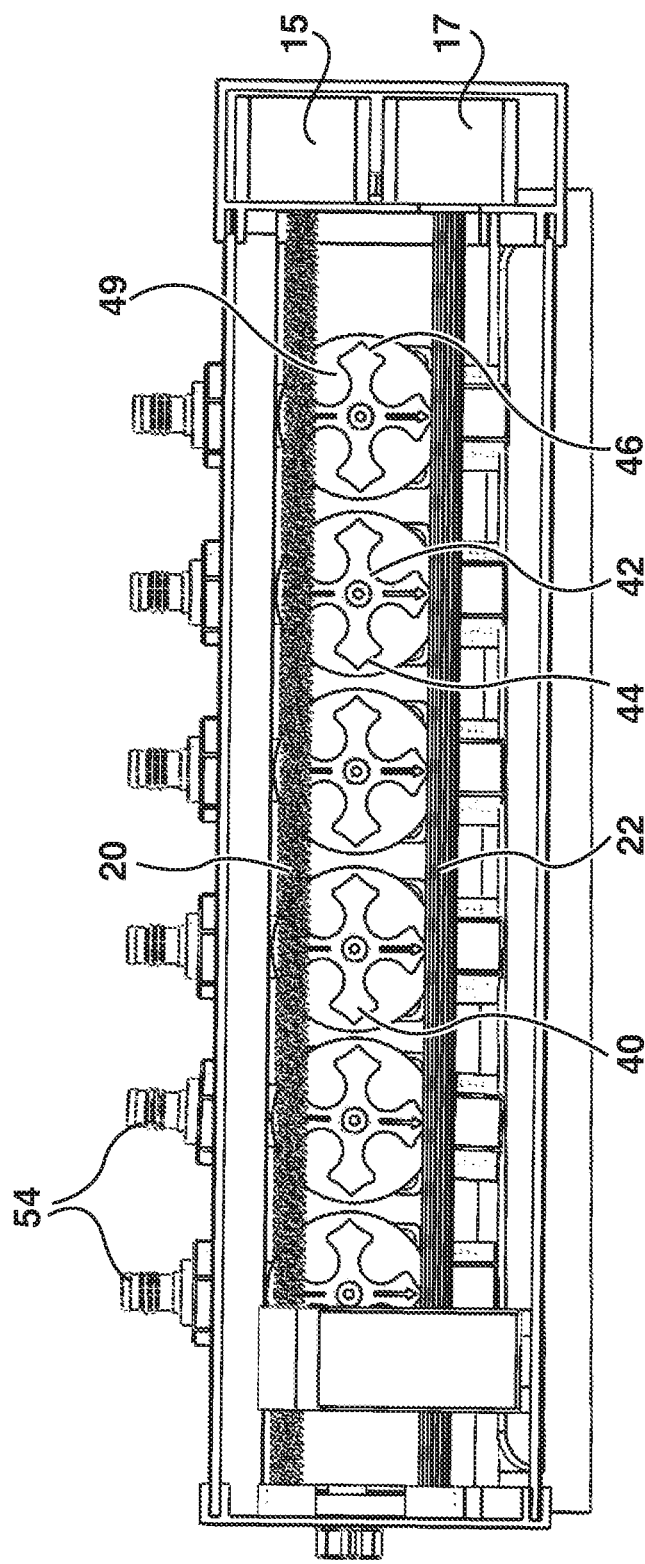
FIG. 5 is a side cutaway view of the manifold.

As shown by way of example in FIG. 5, the cross gear 40 attached to each respective valve has four semicircular receptacles or semicircular recesses 42 (or arc-shaped zones) for receiving the round tip of the actuator carried by the slider. On each side of the receptacles 42 are concave surfaces 46 that terminate in one of four pointed tips 44. This construction ensures that the actuator cannot get stuck on the cross gear. In other words, regardless where the actuator engages along the surface of the cross gear, the actuator will be forced into proper engagement with one of the four receptacles 42. Because the valves in the manifold are in a linear arrangement, the actuator can be moved to access any desired valve by simply translating the slider back and forth using the screw drive. Since the valves are quarter-turn valves, it does not matter whether the actuator engages from the left or from the right to either open or close any given valve.

In the embodiment depicted by way of example in FIG. 5, a first electric motor 15 drives the screw drive 20. A second electric motor 17 drives the splined rotatable shaft 22.

Figure 6:
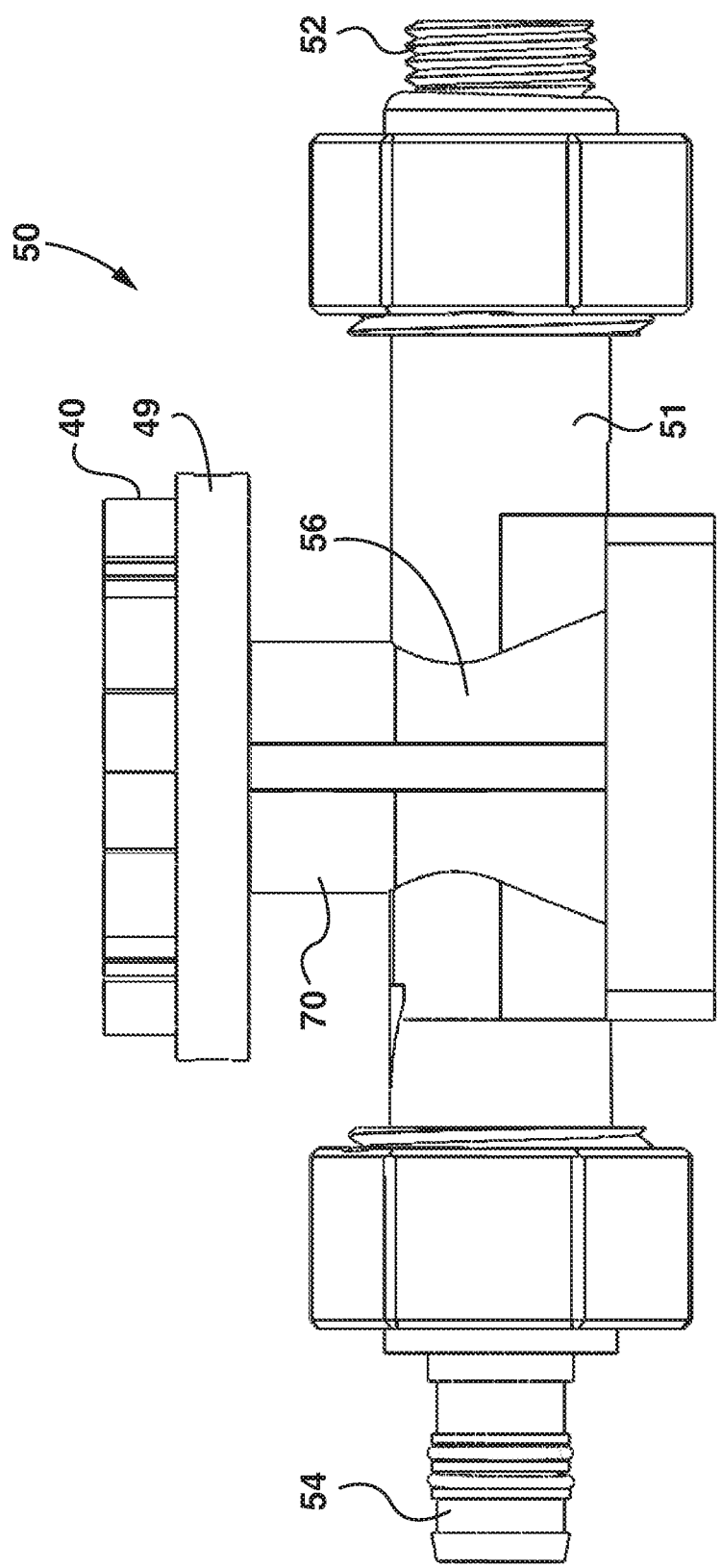
FIG. 6 is a side view of a valve used in the manifold.
Figure 7:
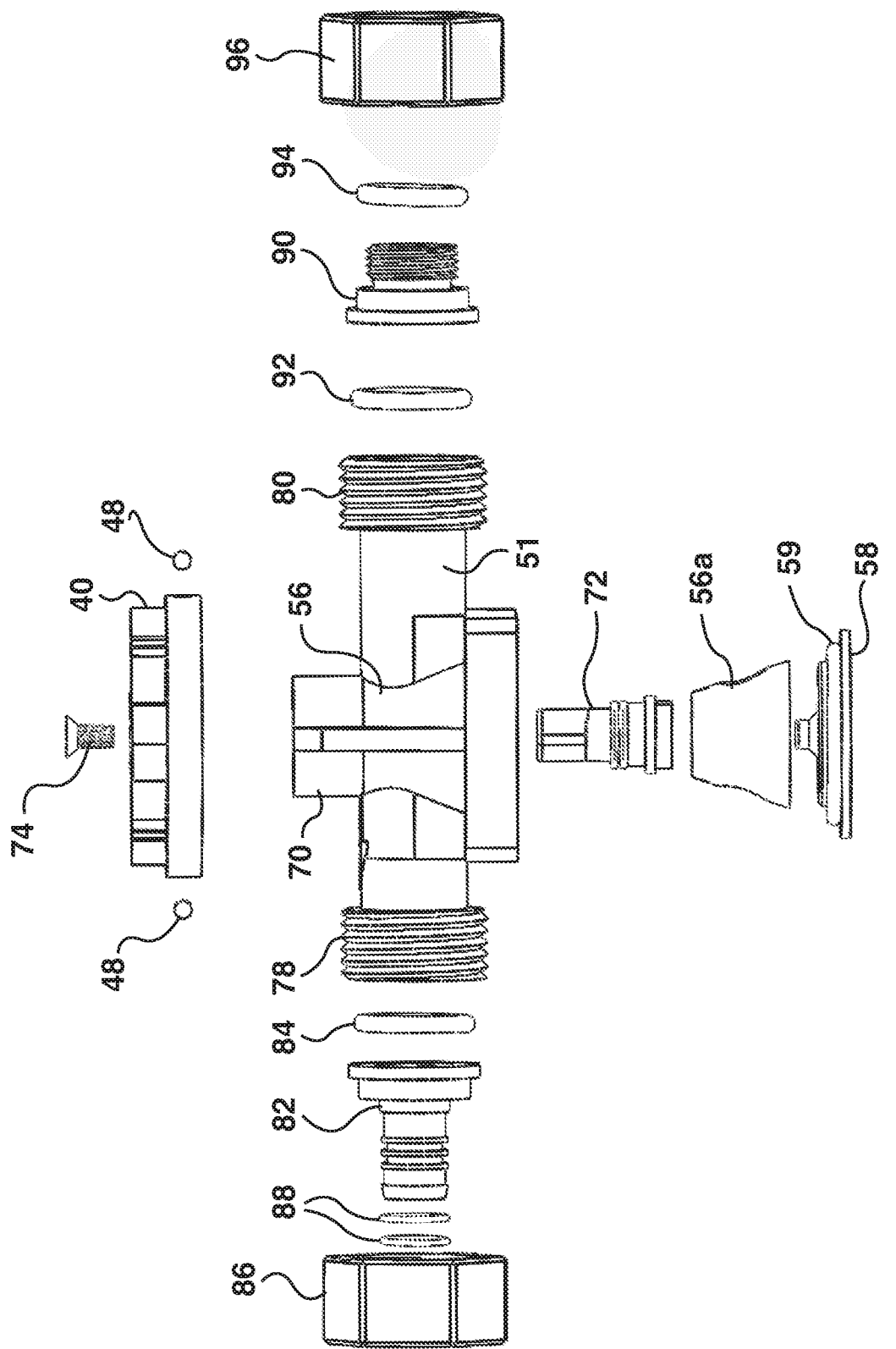
FIG. 7 is an exploded view of the valve.
Figure 8:
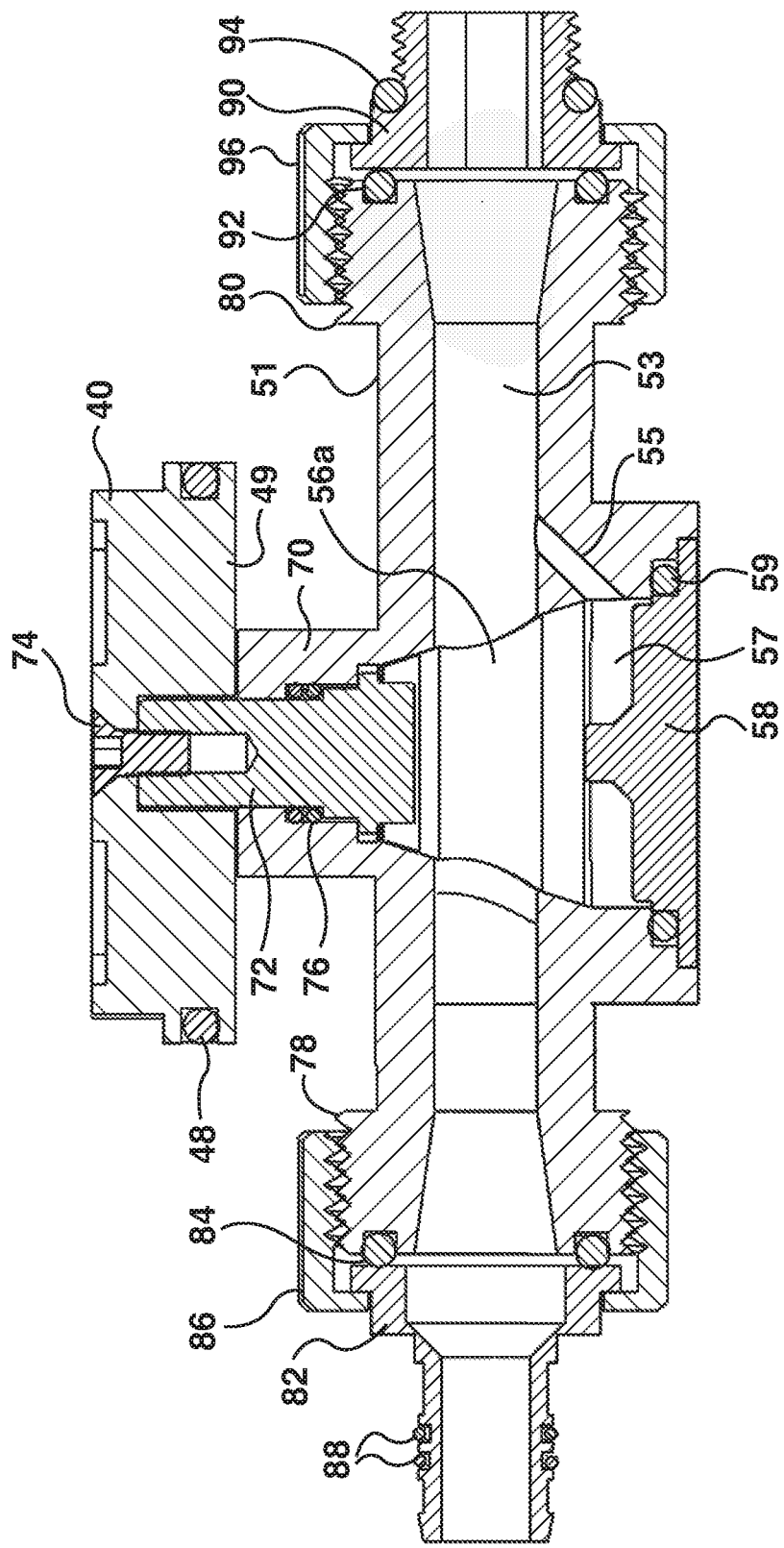
FIG. 8 is a cross-sectional view of the valve.
Figure 9:
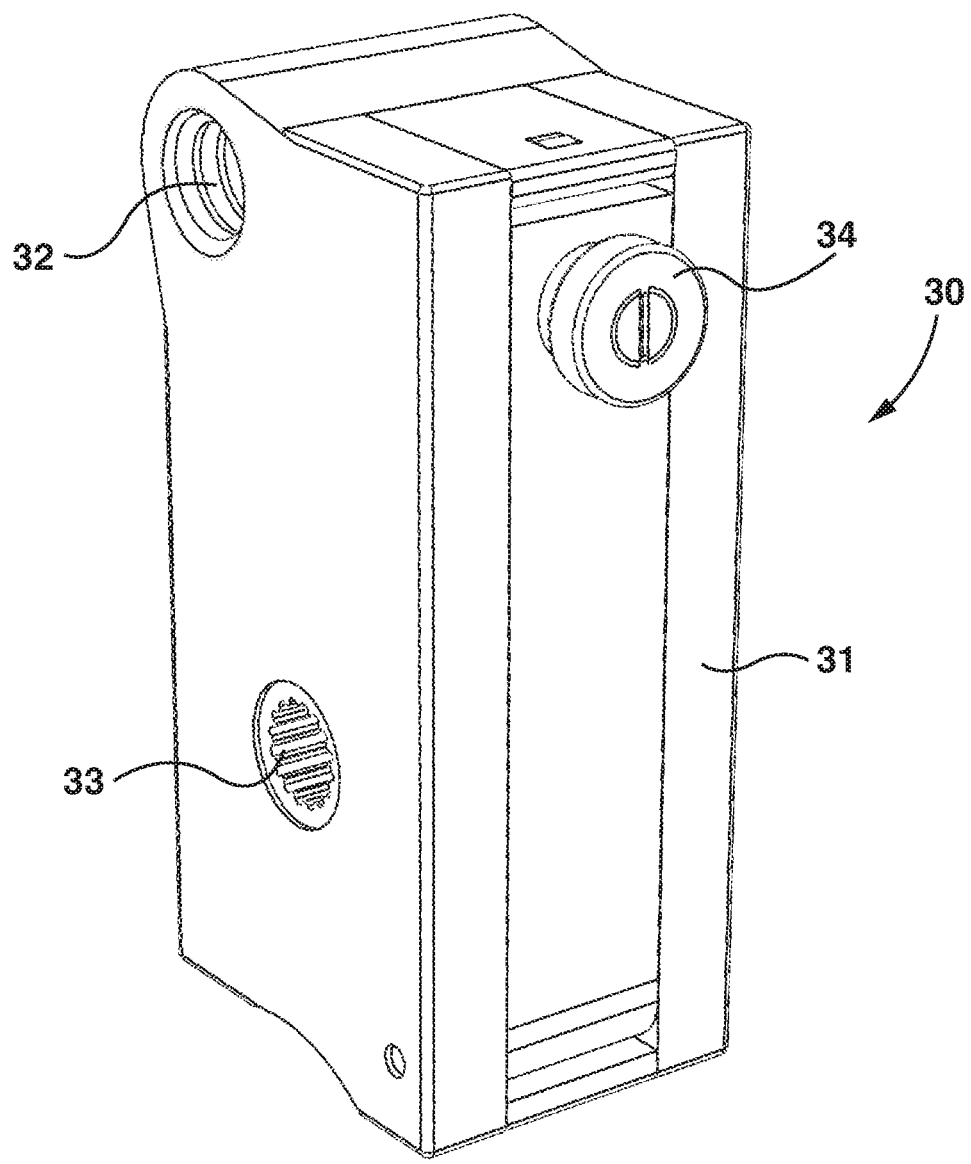
FIG. 9 is an isometric view of a slider used in the manifold.
Figure 10B:
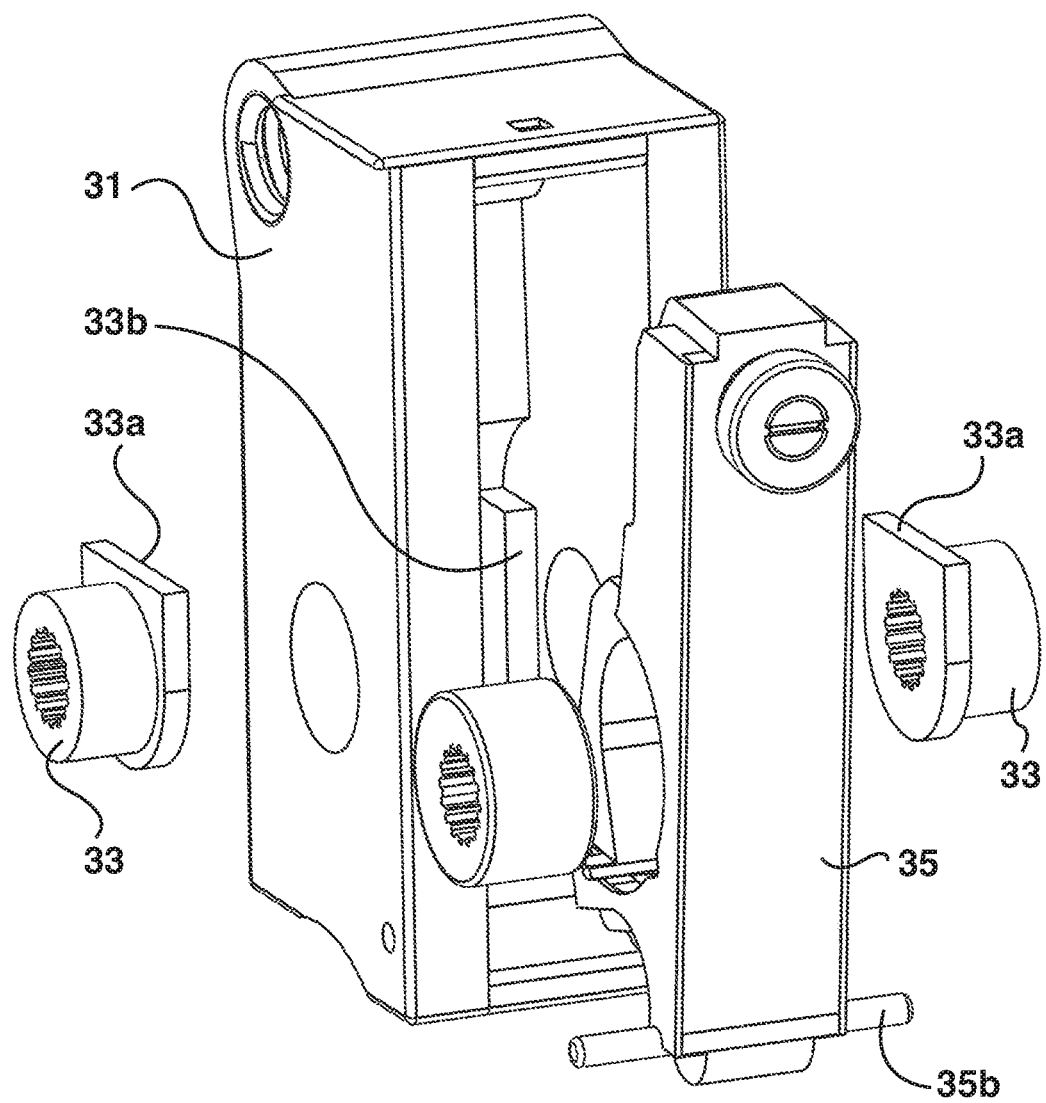
FIG. 10B is an exploded view of a second embodiment of the slider.

FIGS. 6-8 depict one of the valves 50. Each valve 50 has a valve body 51 defining a central water passageway 53 or conduit from the inlet 52 to the outlet 54. The cross gear 40, which was introduced earlier, is mounted to a respective disk 49. The disk 49 sits between a neck 70 of the valve body 51 and the cross gear 40. Each disk 49 has a pair of magnets 48 to enable a sensor to sense an orientation of each of the cross gears. The magnets 48 may be attached to two diametrically opposed tips of the cross gear. The magnets 48 are detectable by a sensor connected to a microcontroller. The microcontroller (or microprocessor) can then determine a position of the cross gear 48 of the valve 50 based on the magnets. Any suitable control system and control algorithm can be adapted to operate this mechanism. The control system may be implemented in hardware, software, firmware or any suitable combination thereof.

FIG. 8 depicts a water-diversion channel 55 in the valve 50. The channel 55 diverts water to exert pressure on a cone-shaped (or frusto-conical) plug 56a fitted into the plug-receiving space 56 inside the valve 50. This pressure secures the cone-shaped plug inside the valve. When secured in its proper position in the plug-receiving space 56, the plug 56*a* provides a fluid-tight seal to minimize leakage. A water volume 57 is defined by the space between the plug 56*a* and a cap 58 and O-ring 59. The plug has a circular bore passing through its frusto-conical body. Its upper surface has a slot for receiving a stem, as will be explained below in greater detail.

In the embodiment shown in FIGS. 6-8, the cone-shaped plug 56*a* tapers outwardly in a direction away from the cross gear. The outward taper may be a nonlinear taper as shown. The angle of the taper is 10-25 degrees, preferably 17-18 degrees and more preferably 17.5 degrees. The plug may be made of Teflon®, i.e. polytetrafluoroethylene (PTFE), or any other equivalent or suitable material. The valve body may be made of high-temperature nylon or any other equivalent or suitable material, optionally with a solid film lubricant such as, for example, a Teflon film or any other suitable dry film lubricant.

In the embodiment shown in FIGS. 6-8, the neck 70 has an internal cavity for receiving a stem 72 which is fastened to the cross gear and disk by a threaded fastener 74, e.g. a machine screw. A pair of floating O-rings are disposed between the stem and the internal wall of the neck. The stem is connected to the plug 56*a* such that rotation of the stem causes rotation of the plug. In one specific embodiment, the plug 56*a* has a slot for receiving a bottom of the stem to enable the stem to exert torque on the plug.

In the embodiment shown in FIGS. 6-8, the valve body 51 has first and second externally threaded ends 78, 80. Into the first end 78 (on the outlet side) a nipple-type adaptor 82 is inserted with an O-ring 84 between the adaptor and an annular groove surrounding the water conduit. A first nut 86 threads onto the externally threaded end 78 to secure the nipple-type adaptor in place. O-rings 88 may be disposed in respective annular grooves on the outer periphery of the nipple-type adaptor. Into the second end 80 (on the inlet side) a threaded adaptor 90 is inserted with an O-ring 92 between the flange-like face of the adaptor 90 and an annular groove surrounding the water conduit. Another O-ring 94 is disposed on an outside shoulder of the adaptor 90. A second nut 96 is threaded over the externally threaded end 80 to secure the adaptor in place.

FIGS. 9-13 depict the slider 30. The slider 30 includes a slider housing 31, a receptacle or hole 32 in the slider housing for receiving the screw drive described earlier and a splined hole 33 in the slider for receiving the splined rotatable shaft described earlier. In the illustrated embodiment, the splined hole 33 is provided by two splined inserts 33 that fit rotationally into the side walls of the slider housing. The inserts rotate freely within the holes in the side walls. The slider 30 includes an actuator 34 that is capable of protruding from the slider in response to rotation of the splined rotatable shaft. The slider housing 31 has a pivot arm 35 holding the actuator 34. The pivot arm 35 is rotationally movable from a retracted position inside the slider housing 31 to an extended position protruding from the slider housing 31. The pivoting arm 35 pivots about a pivot axis defined by a transverse bore 35*a* in the pivot arm that receives a pivot shaft 35*b* or pin that is rotationally supported by holes in the slider housing (as shown in FIG. 10A). The pivoting arm 35 that holds the actuator 34 comprises an internally splined cam 36 aligned with the splined inserts 33. The splined cam 36 rotates with the splined shaft to cause the pivoting arm to pivot about a pivot axis, thereby causing the actuator to protrude (or retract) from the slider housing. The actuator 34 may include a cylindrical roller bearing 34*a* (in the form of an annulus) fastened by a threaded fastener 34*b* to the pivoting arm 35. The bearing 34*a* in the illustrated embodiment has a diameter that matches that of the semicircular recesses in the cross gear. The bearing 34*a* may be mounted over a spacer 34*c* (or equivalent circular lip or ridge) as shown by way of example in FIG. 10A to space the bearing from the pivot arm 35.

In the embodiment depicted by way of example in FIGS. 9-13, the slider 30 comprises a magnet 37 for position sensing. The magnet may be disposed in a magnet receptacle 38 as depicted for example in FIGS. 10A, 10B and FIGS. 11A-11B.

Figure 11A:
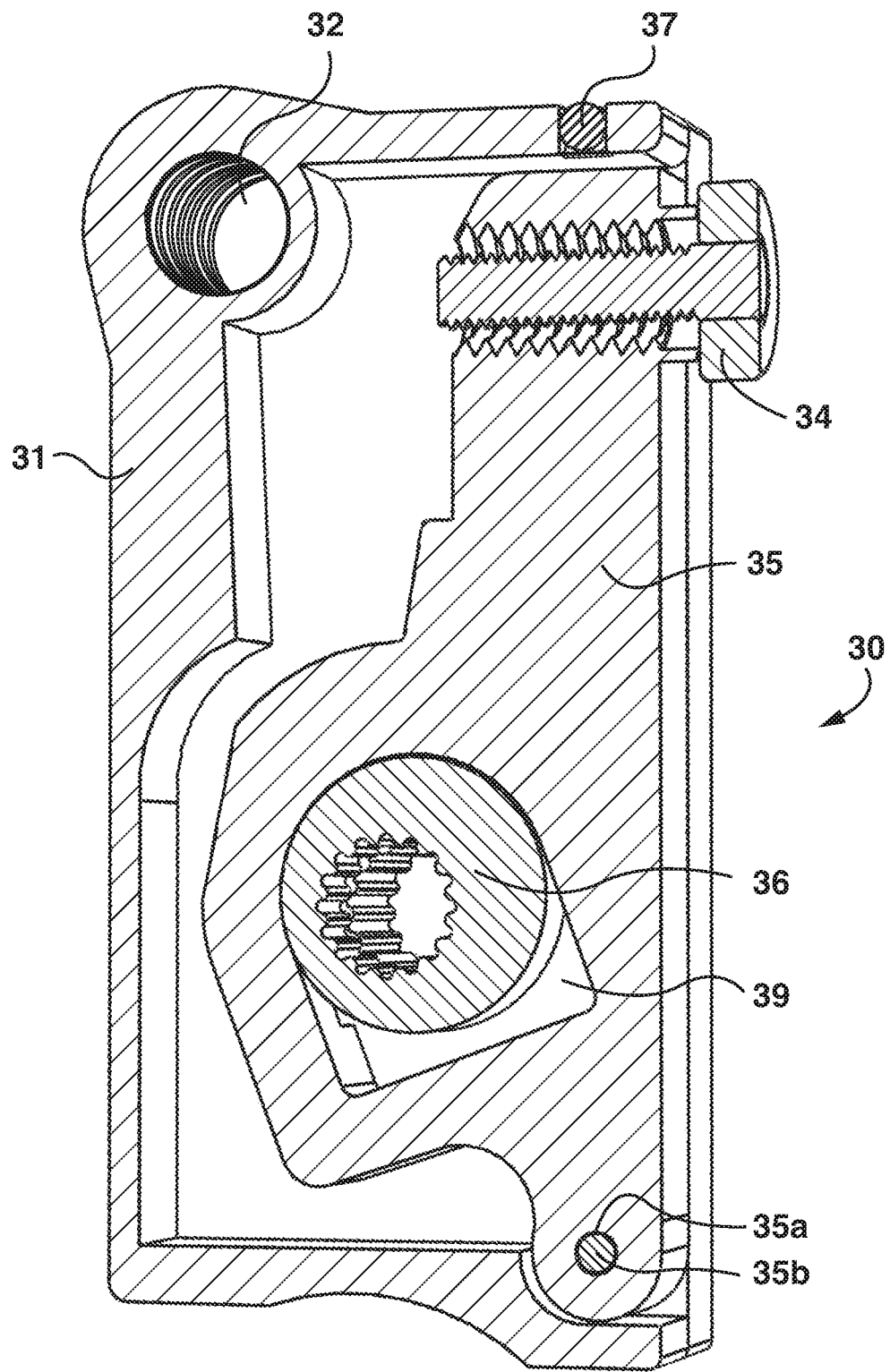
FIG. 11A is a cutaway view of the first embodiment of the slider with its actuator extended.
Figure 11B:
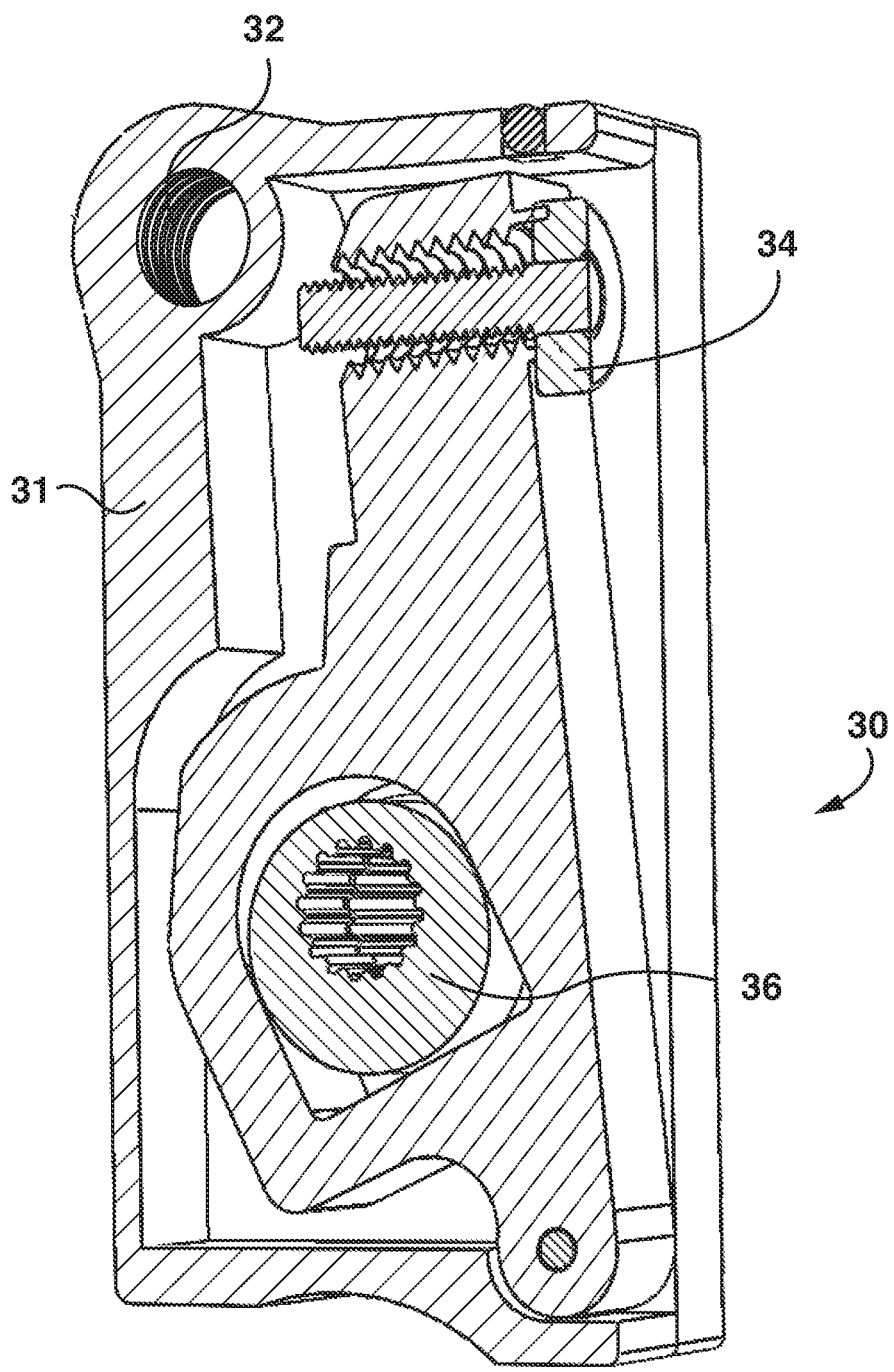
FIG. 11B is a cutaway view of the first embodiment of the slider with the actuator retracted.
Figure 11C:
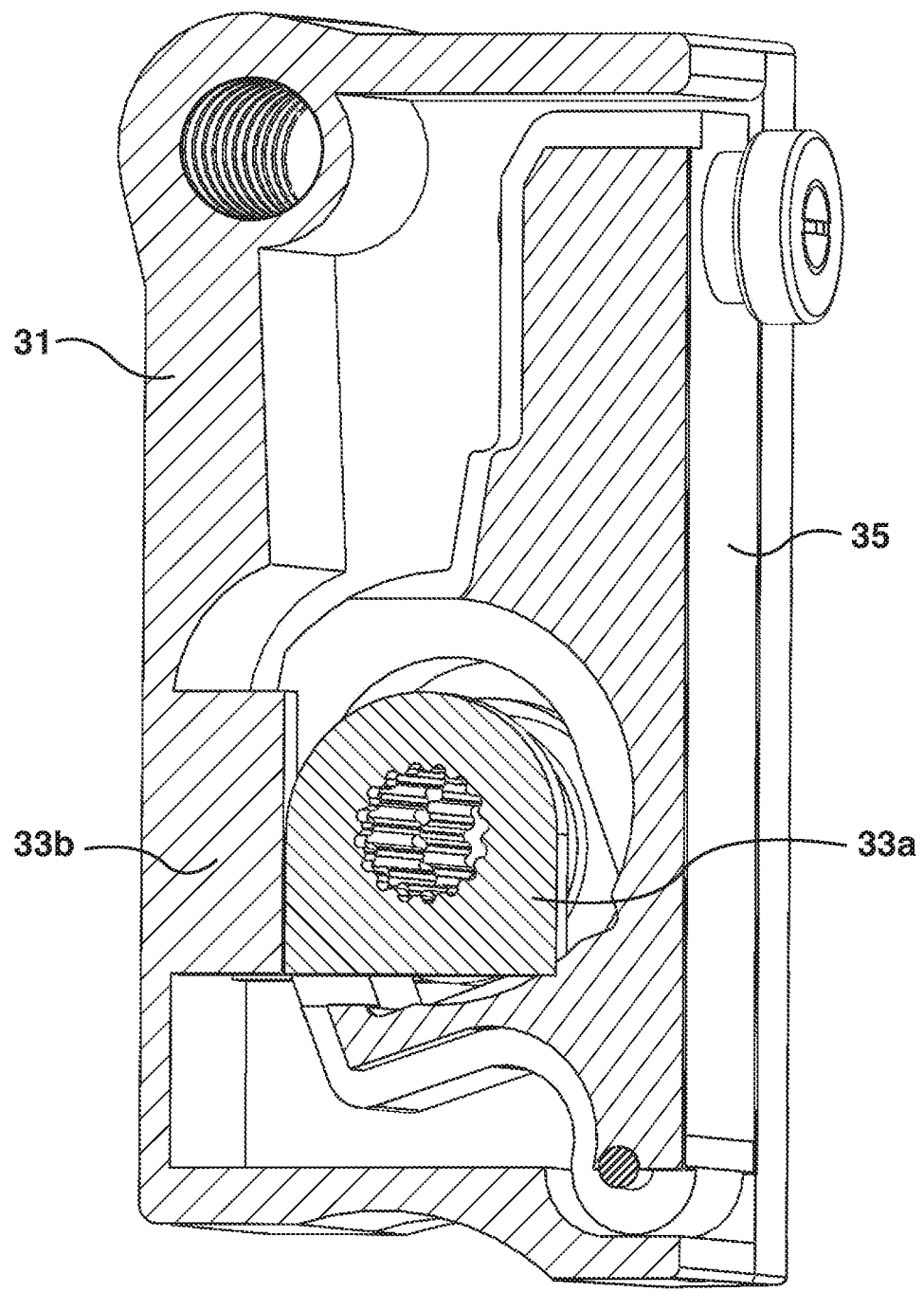
FIG. 11C is a cutaway view of the second embodiment of the slider with the actuator extended.
Figure 11D:
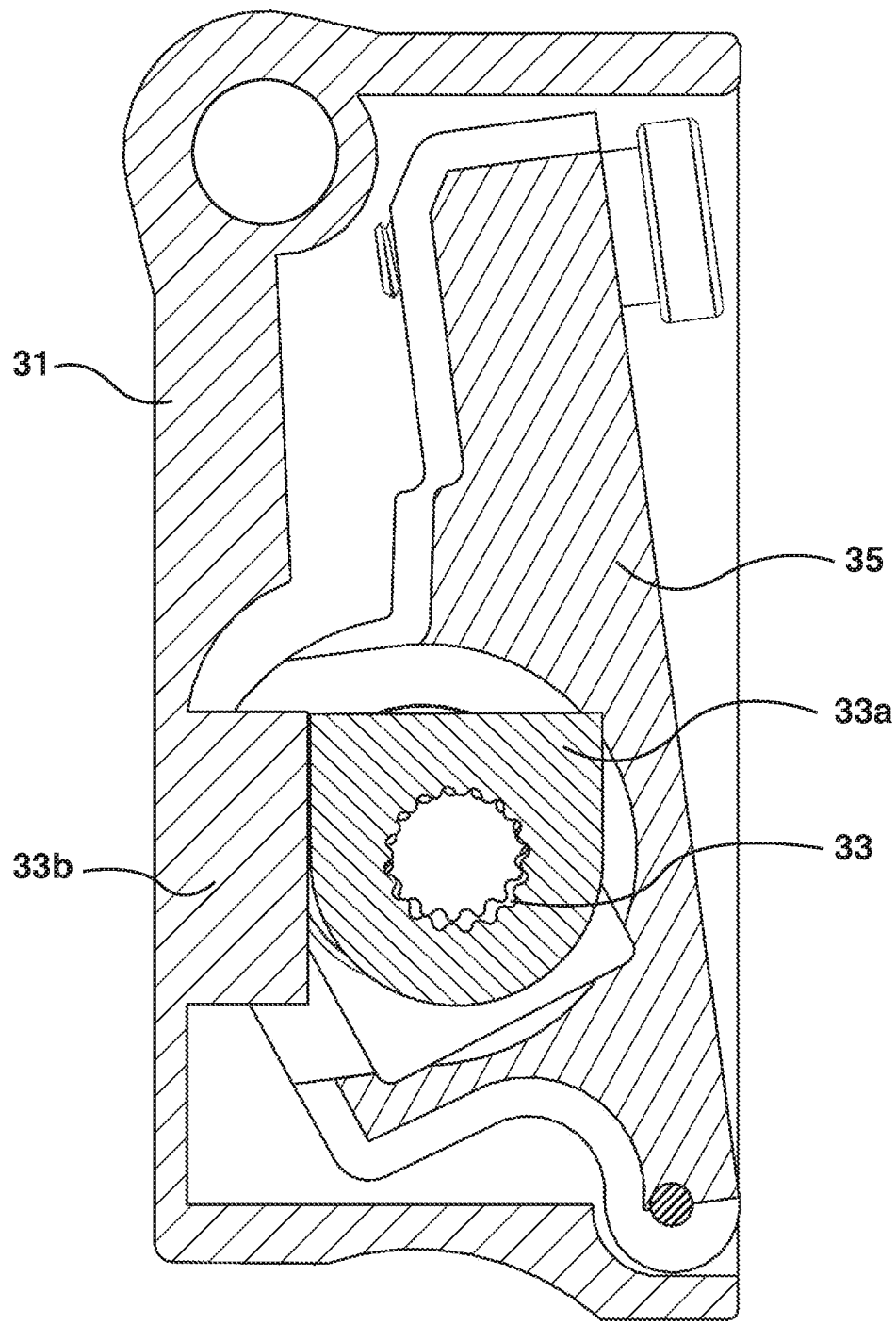
FIG. 11D is a cutaway view of the second embodiment of the slider with the actuator retracted.

The splined cam 36 rotates eccentrically within the space 39 to cause the pivoting arm to rotate 35 from a retracted position (FIG. 11B) to an extended position (FIG. 11A) or vice versa. In a second embodiment, which is illustrated in FIGS. 11C and 11D, the splined inserts 33 ("bushings") have a square end 33*a* that locks against a square block 33*b* on each side of the slider body 31. This limits the motor so it can only turn the splined inserts no more than 180 degrees. In a variant, the 180-degree stop(s) could be also placed on either end (or both ends) of the splined drive shaft 22. The second embodiment with the square end 33*a* is believed to be a better mechanism than the first embodiment.

Figure 13:
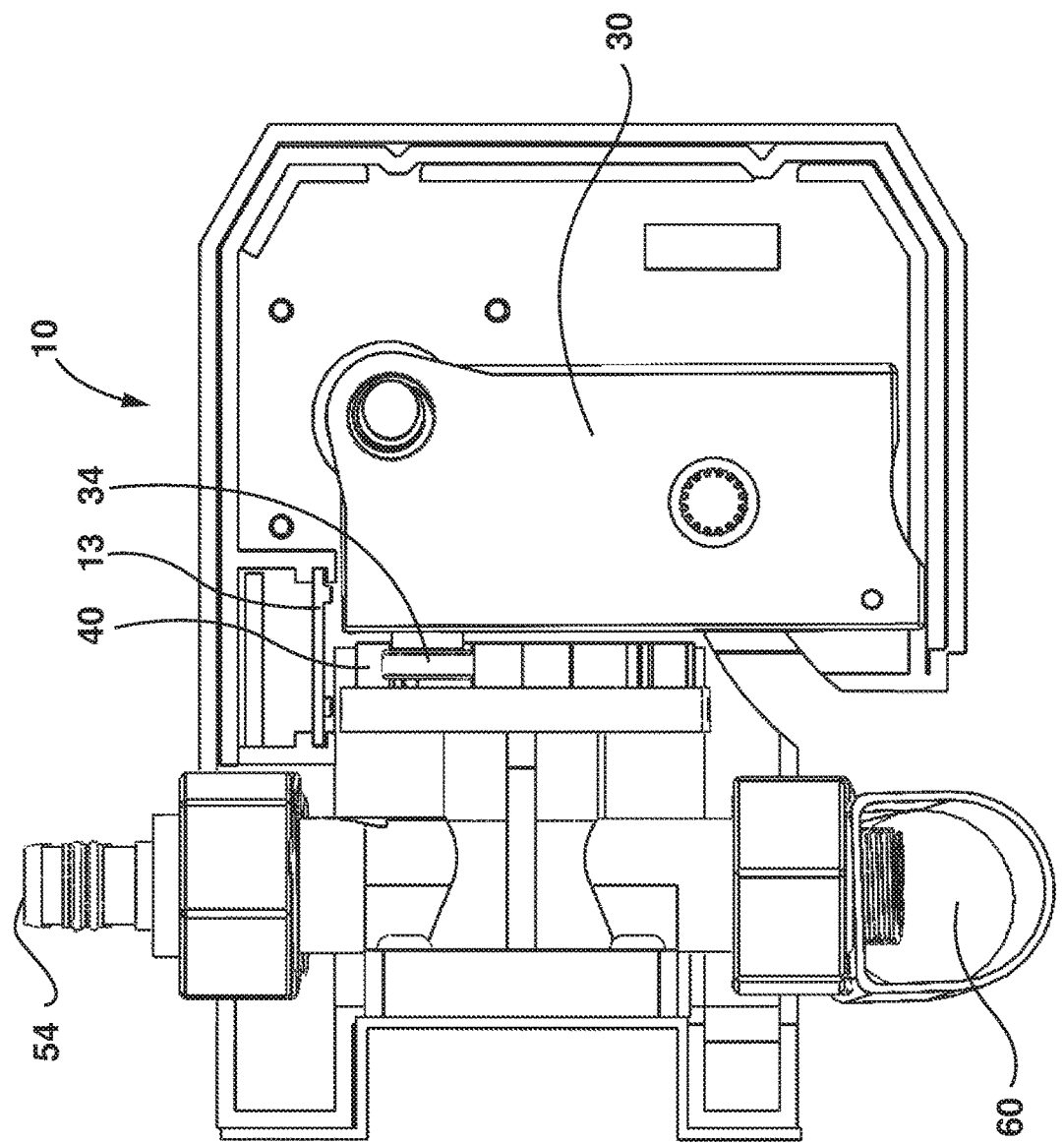
FIG. 13 is a side cutaway view of the slider and valve assembly with the actuator extended.

FIGS. 12 and 13 show the interaction of the slider 30 with the rest of the manifold 10. In FIG. 12 the actuator 34 of the slider 30 is retracted such that it is not visible in this view. The actuator 34 is retracted within the slider housing 31. There is accordingly a gap between the slider 30 and the cross gear 40. In FIG. 13, the actuator 34 is shown engaged with the cross gear 40.

It should be understood that the manifold 10 depicted in FIGS. 1-13 is presented by way of example only. This particular design of the manifold is believed to be the best mode of implementing the present invention but it should be appreciated that many variations in the mechanism(s) may be made without departing from the inventive concept(s) presented herein. For example, the splined shaft may be replaced by a keyed shaft.

Figure 14:
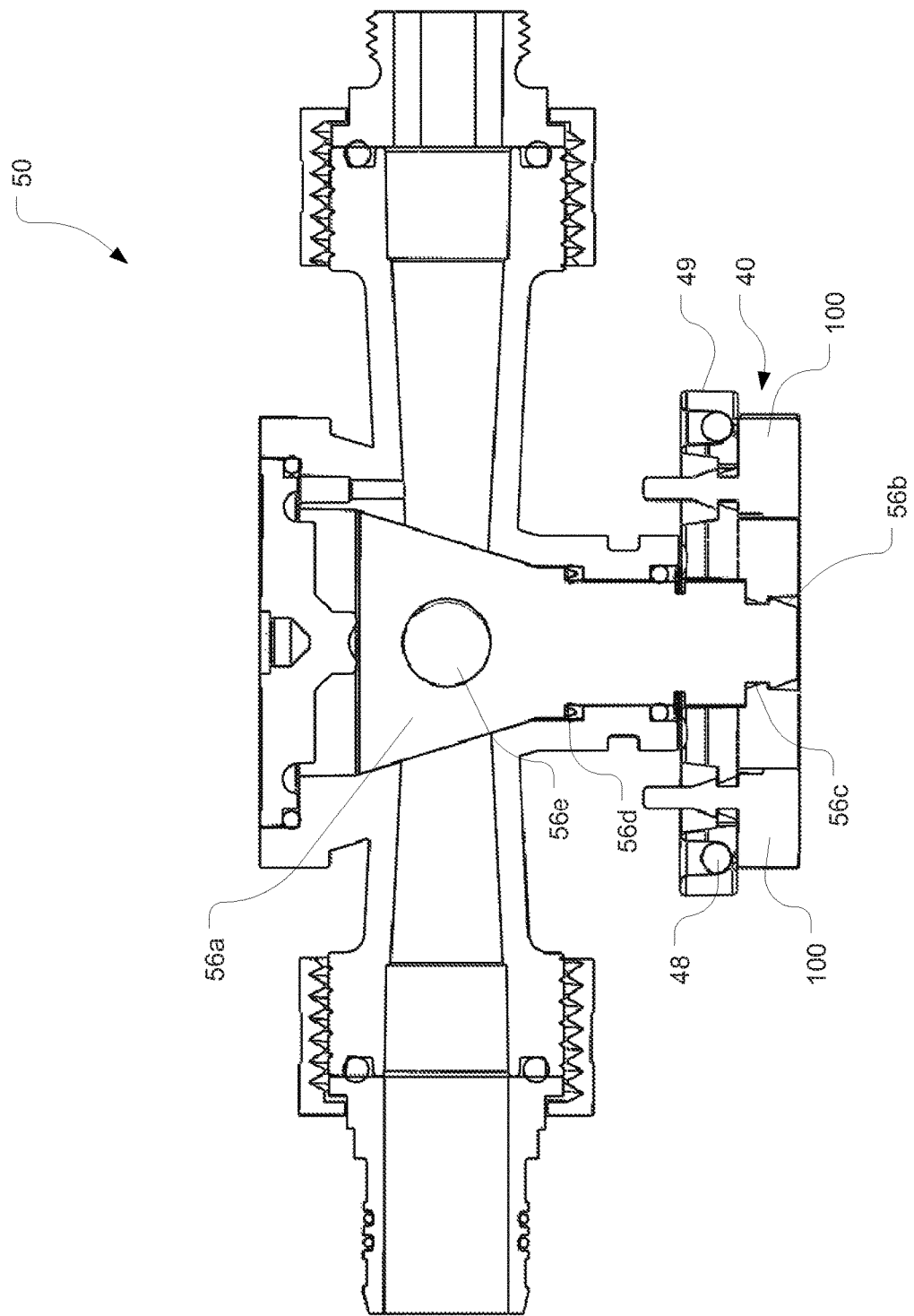
FIG. 14 is a cross-sectional view of a valve in accordance with another embodiment.

FIG. 14 is a cross-sectional view of a valve 50 in accordance with another embodiment. In the valve 50 shown by way of example in FIG. 14, the conical plug 56*a* is made of a single integral piece. Unlike the plug shown in FIG. 7, in which the plug has a separate stem 72, the plug 56*a* of FIG. 14 is formed of a single integral (unitary) piece of material. The unitary cone-shaped plug has an integral stem, not a separate stem. The plug 56*a* has an arrowhead tip 56*b*, a first shoulder 56*c*, and a second shoulder 56*d* as shown by way of example in the figure. The arrowhead tip is adapted to snap into a hole in the cross gear. Snapping (press-fitting) the arrowhead tip into the hole of the cross gear facilitates assembly and avoids the problem of having to screw a fastener into a Teflon plug. The single unitary plug has a conical plug portion through which a circular hole 56*e* extends to permit water to flow through the plug when the plug is oriented with the water passageway of the valve. The plug may be made of Teflon®, i.e. polytetrafluoroethylene (PTFE), or any other equivalent or suitable material. The outward taper may be a nonlinear taper as shown. The angle of the taper is 10-25 degrees, preferably 17-18 degrees and more preferably 17.5 degrees. As shown by way of example in FIG. 14, the valve also has a cross gear 40, disk 49 and magnets 48. Each cross gear 40 has four semicircular recesses and four arms that terminate in pointed tips. In addition, the valve 50 of FIG. 14 has non-jamming rubber tips 100 acting as the pointed tips to prevent jamming of the cross gear. The non-jamming rubber tips are able to flex to prevent the cross gear from getting stuck in the unlikely event that the cross gear begins to jam.

Figure 15:
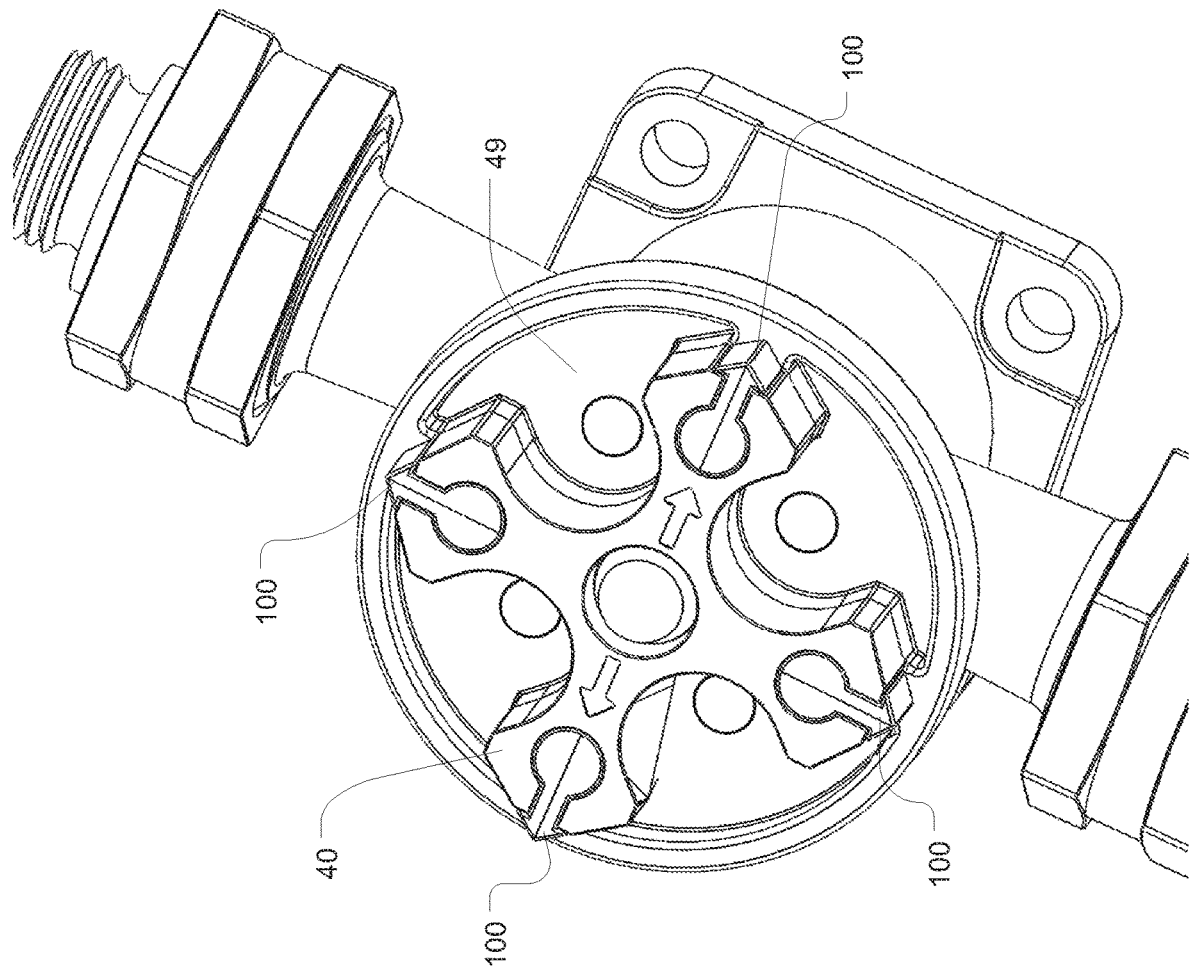
FIG. 15 is an isometric view of a cross gear with non-jamming rubber tips in accordance with another embodiment.

FIG. 15 is an isometric view of a cross gear 40 showing the non-jamming rubber tips 100 in accordance with another embodiment. The non-jamming rubber tips 100 may be made of any suitable rubber or elastomeric substance. In the embodiment depicted in FIG. 15, the rubber tips are inserts that are placed into correspondingly shaped receptacles formed within each arm. Each rubber insert has a circular body attached to an arrowhead as shown. In one specific implementation, two of the four rubber tips that are diametrically opposed are colored to visually distinguish these two tips from the two other tips.

Figure 16:
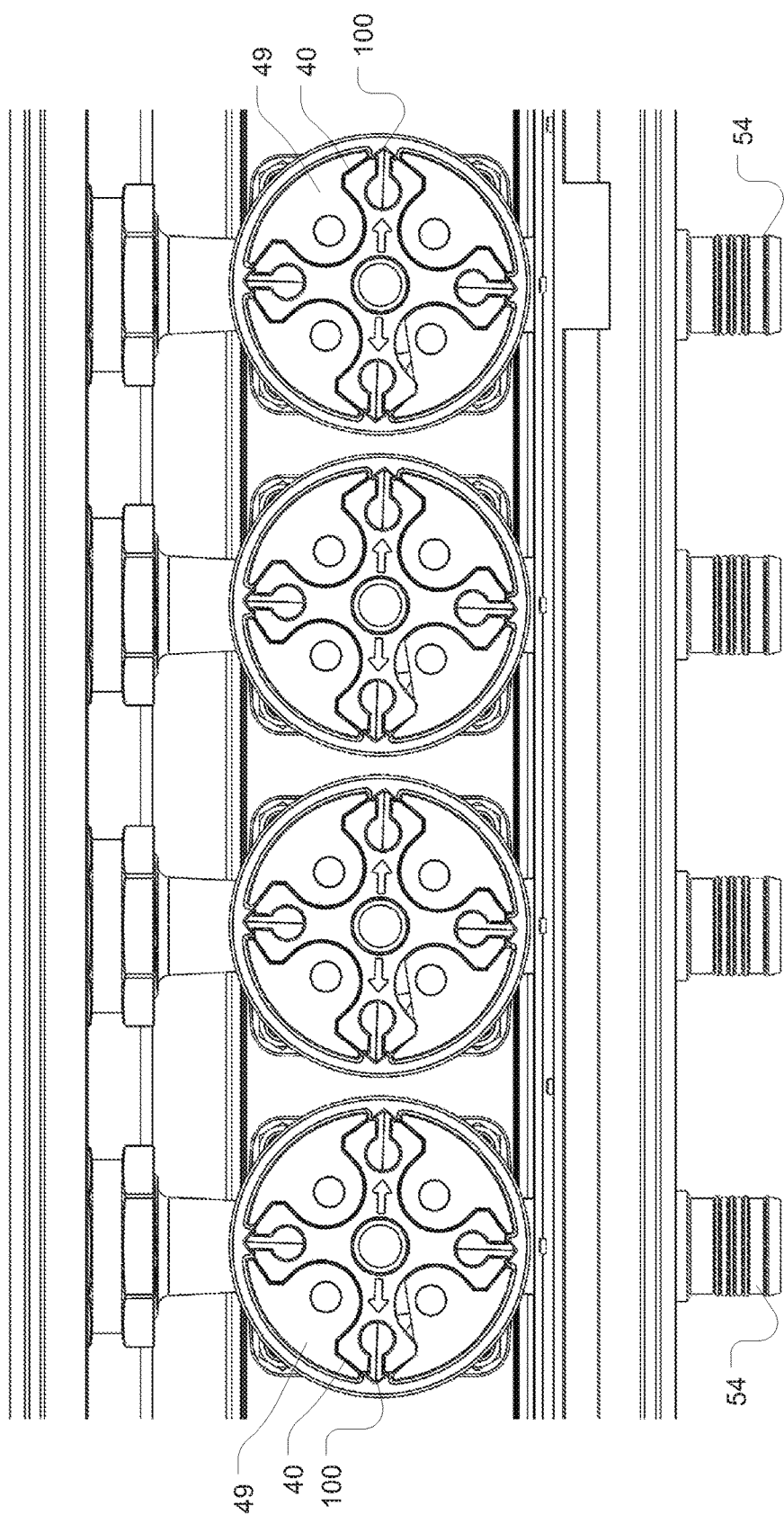
FIG. 16 is an isometric view of four cross gears with non-jamming rubber tips.

FIG. 16 is an isometric view of four cross gears 40 with non-jamming rubber tips 100. On each of the cross gears 40 are four semicircular recesses and four arms that terminate in pointed tips. Each of the tips is a rubberized or elastomeric tip that flexes to avoid jamming the mechanism. These tips can be replaced when worn.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A manifold comprising:
a frame;
a plurality of valves supported by the frame, each valve having a cross gear;
a screw drive;
a splined rotatable shaft parallel to the screw drive; and
a slider driven by the screw drive over the splined rotatable shaft, the slider comprising an actuator that protrudes from the slider in response to rotation of the splined rotatable shaft to thereby engage one of the cross gears to actuate a respective one of the plurality of valves, wherein each cross gear has four semicircular recesses and four arms that terminate in pointed tips, and wherein the tips are non jamming rubber tips, wherein the actuator is mounted to a pivoting arm that is rotationally movable from a retracted position inside the slider to an extended position protruding from the slider.

2. The manifold of claim 1 wherein each of the plurality of valves has an integral single-piece cone-shaped plug that tapers outwardly in a direction away from the cross gear.

3. The manifold of claim 2 wherein the cone-shaped plug tapers both outwardly and nonlinearly.

4. The manifold of claim 2 wherein the cone-shaped plug has an angle of taper of 10-25 degrees.

5. The manifold of claim 2 wherein the cone-shaped plug has an angle of taper of 17-18 degrees.

6. The manifold of claim 2 wherein each of the plurality of valves has a water diversion channel to divert water to exert pressure on the cone-shaped plug in the valve to secure the cone-shaped plug to enable the plug to provide a fluid-tight seal.

7. The manifold of claim 1 wherein the pivoting arm that holds the actuator comprises an internally splined cam that rotates with the splined shaft to cause the pivoting arm to pivot about a pivot axis, thereby causing the actuator to protrude from the slider.

8. The manifold of claim 1 further comprising a magnet that rotates with each cross gear to enable an orientation of each of cross gear to be sensed.

9. The manifold of claim 1 wherein the cross gears are mounted to respective disks each having a pair of magnets to enable a sensor to sense an orientation of each of the cross gears.

10. The manifold of claim 1 wherein the screw drive and the splined rotatable shaft are parallel to a water supply tube that feeds inlets of the valves.

11. The manifold of claim 1 wherein the actuator comprises an annulus fastened to a pivoting arm of the slider, the annulus having a diameter that matches that of the semicircular recesses in the cross gear.

12. The manifold of claim 1 wherein the actuator comprises an annulus fastened to a pivoting arm of the slider, the annulus having a diameter that matches that of the semicircular recesses in the cross gear.

13. The manifold of claim 1 wherein the slider comprises a magnet for position sensing.

14. The manifold of claim 1 wherein each cross gear is connected to a plug-shaped cone in the valve by a stem that has a shoulder for receiving floating O-rings between the shoulder and an internal surface of a housing of the valve.

15. The manifold of claim 1 wherein each arm of each cross gear has a head defined by a pair of concave surfaces terminating at the pointed tip.

* * * * *